(12) United States Patent
Sanchez Cruz et al.

(10) Patent No.: US 9,827,920 B2
(45) Date of Patent: Nov. 28, 2017

(54) DETACHABLE INTERIOR TRIM PANEL ASSEMBLY FOR A VEHICLE

(71) Applicants: Jose Alberto Sanchez Cruz, Atizapan de Zaragoza (MX); Daniel Corro Flores, Metapec (MX); Jason E Schultz, Clarkston, MI (US); Maurice J. Gisler, Rochester Hills, MI (US)

(72) Inventors: Jose Alberto Sanchez Cruz, Atizapan de Zaragoza (MX); Daniel Corro Flores, Metapec (MX); Jason E Schultz, Clarkston, MI (US); Maurice J. Gisler, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 21 days.

(21) Appl. No.: 15/053,638

(22) Filed: Feb. 25, 2016

(65) Prior Publication Data

US 2017/0246995 A1    Aug. 31, 2017

(51) Int. Cl.
*B60R 13/02* (2006.01)

(52) U.S. Cl.
CPC .......... *B60R 13/0206* (2013.01); *B60R 13/02* (2013.01); *B60R 13/0212* (2013.01); *B60R 13/0225* (2013.01)

(58) Field of Classification Search
CPC . B60R 13/02; B60R 13/0206; B60R 13/0212; B60R 13/0225; B60R 13/0237

USPC ................................................. 296/1.08, 214
See application file for complete search history.

(56) References Cited

U.S. PATENT DOCUMENTS

| 4,390,203 | A | 6/1983 | Lutz et al. |
| 6,070,902 | A | 6/2000 | Kowalski et al. |
| 6,120,091 | A | 9/2000 | Reich et al. |
| 8,615,962 | B1 * | 12/2013 | Perez .................. B60R 13/0206 24/292 |
| 9,114,688 | B2 | 8/2015 | Hirvonen |
| 9,119,444 | B2 | 9/2015 | Nirmel |
| 9,120,436 | B2 | 9/2015 | Geissenhoener et al. |
| 2011/0024058 | A1 * | 2/2011 | Kernmayer ............ B60R 13/02 160/113 |

\* cited by examiner

*Primary Examiner* — Jason S Daniels
(74) *Attorney, Agent, or Firm* — Ralph E. Smith

(57) ABSTRACT

A detachable interior trim panel assembly for a vehicle is provided. The assembly includes an interior trim panel that has an inside surface, an outside surface, and a trim panel perimeter. The interior trim panel includes at least one finger and at least one spring snap that are positioned along the trim panel perimeter. The at least one finger and the at least one spring snap are configured to detachably retain the interior trim panel on a trim panel mounting location of the vehicle. The at least one finger extends outwardly from the trim panel perimeter and is sized to be received in at least one finger receptacle positioned along the trim panel mounting location and the at least one spring snap includes a moveable leg that is configured to engage at least one spring snap receptacle that is also positioned along the trim panel mounting location.

20 Claims, 7 Drawing Sheets

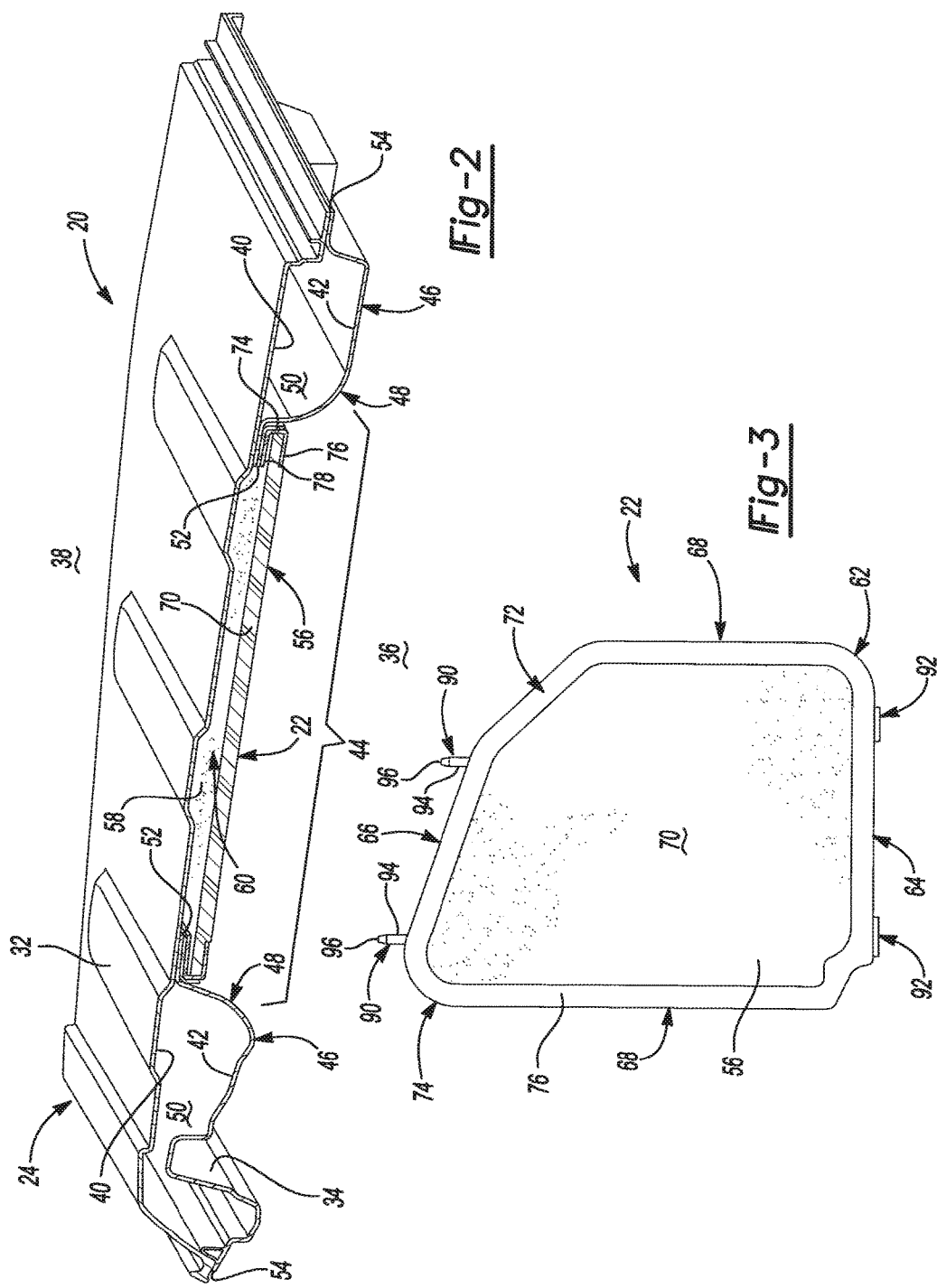

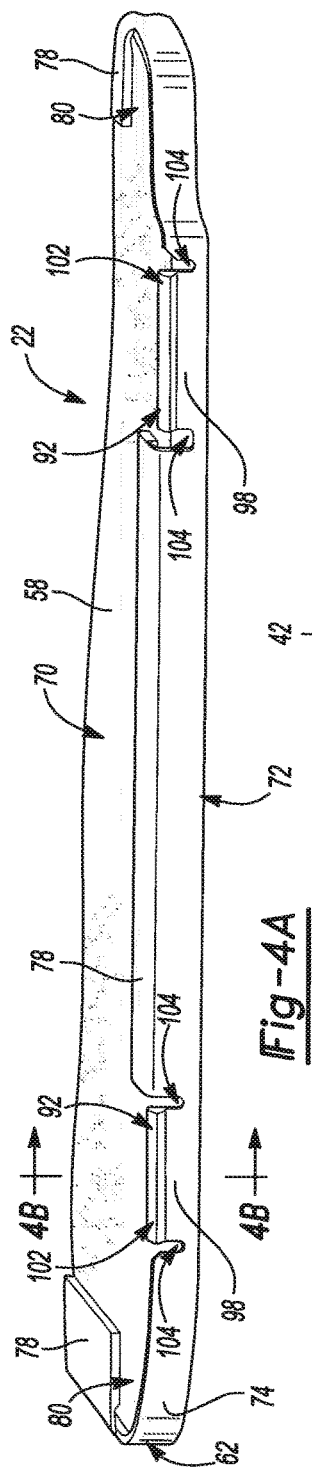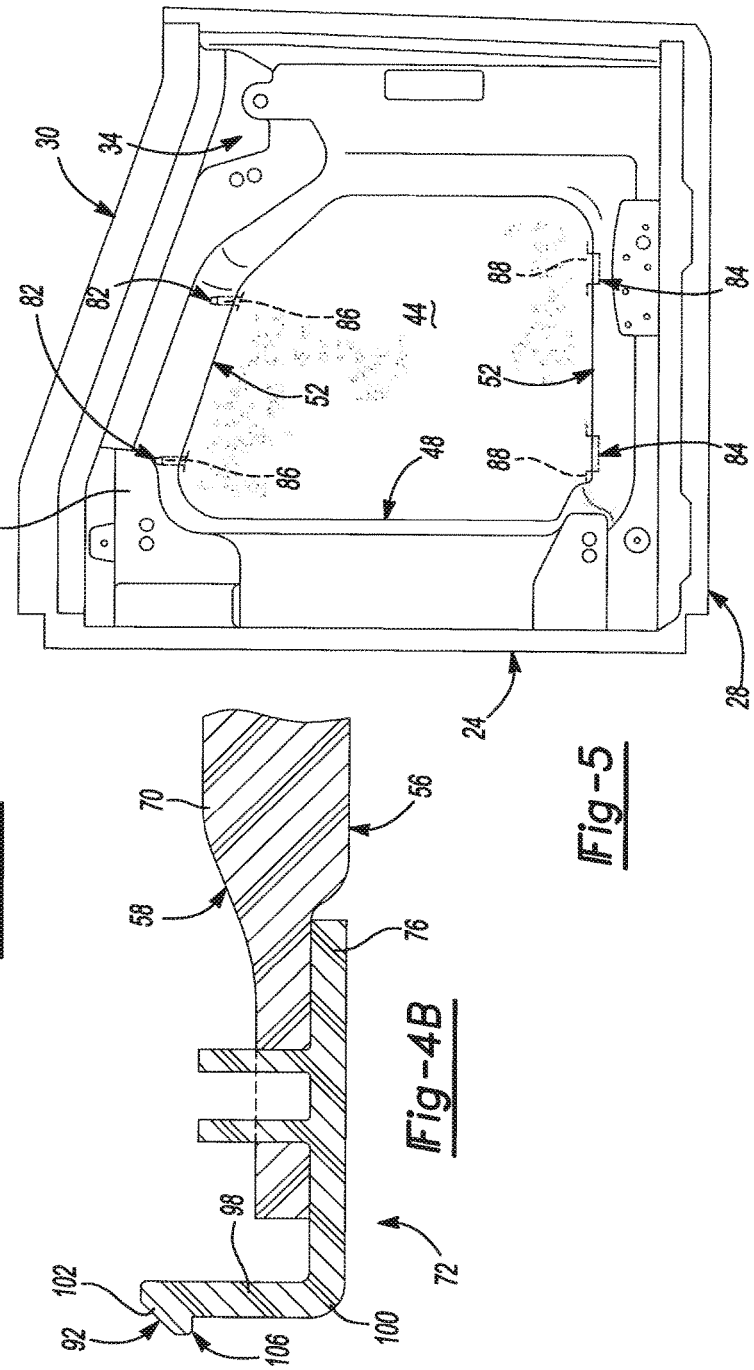

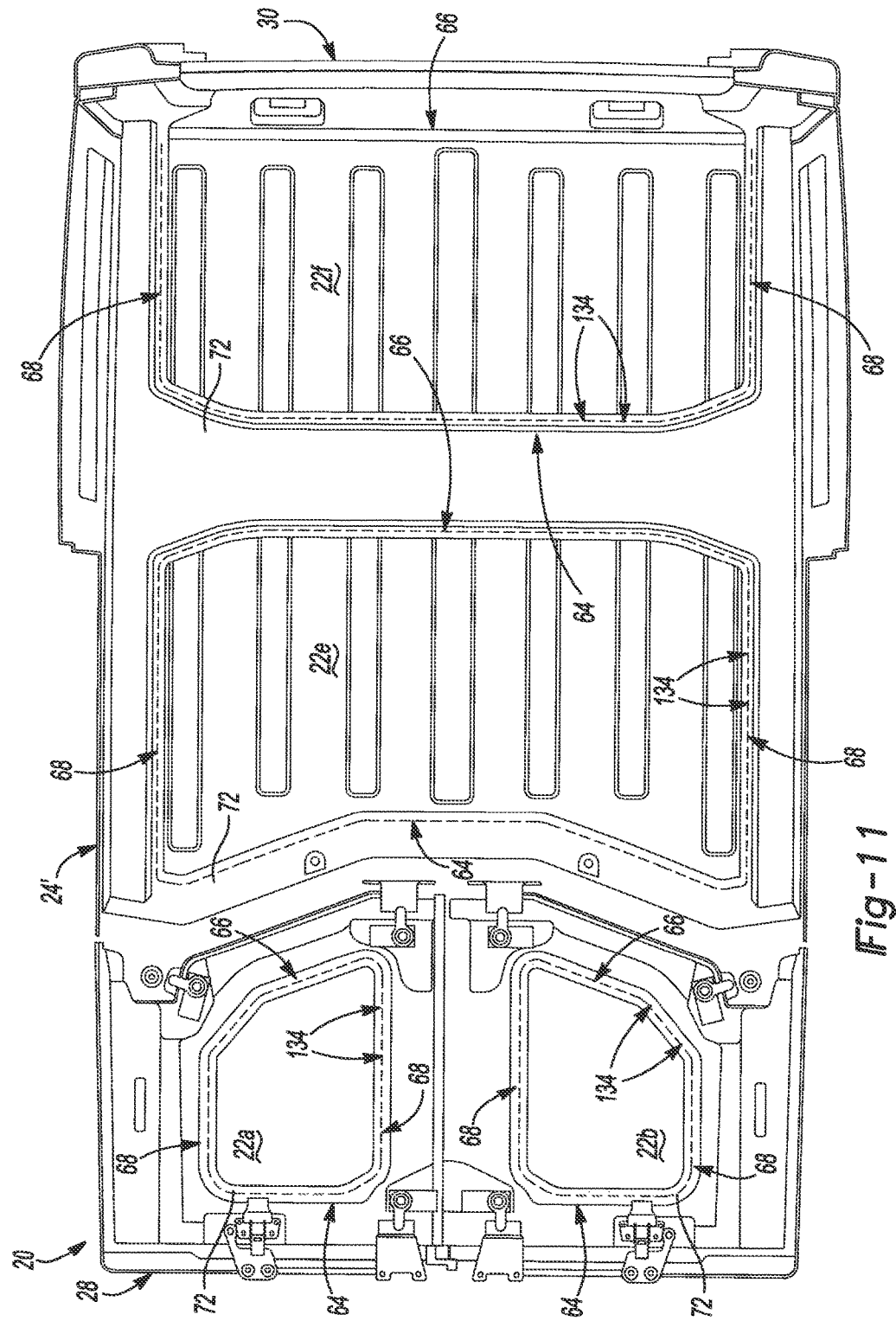

DETACHABLE INTERIOR TRIM PANEL ASSEMBLY FOR A VEHICLE

FIELD

The subject disclosure generally relates to interior trim panel assemblies for vehicles such as automobiles.

BACKGROUND

This section provides background information related to the present disclosure which is not necessarily prior art.

In many of today's vehicles, automobiles included, a variety of different interior trim panels are installed in the passenger compartment. These interior trim panels form part of the vehicle's interior and cover up walls and other components of the vehicle such as electrical wiring, air bags, and HVAC ducting. The result is a passenger compartment that is quieter, more attractive, and more comfortable. In addition, interior trim panels may cover up components that would otherwise pose a risk of injury to a vehicle occupant. Generally speaking, interior trim panels have an inside surface, an outside surface, and a trim panel perimeter. The inside surface of the interior trim panel faces the passenger compartment while the outside surface typically faces one of the walls of the vehicle. Interior trim panels can be made out of a variety of different materials, including by way of non-limiting example, plastic, rubber, cloth, fabric, carbon fiber, woven materials, nonwoven materials, foam, fiberglass, wood, and metal.

Interior trim panels are typically secured to the exterior walls or other vehicle structures by fasteners and/or adhesive. Accordingly, interior trim panels are difficult to remove after they are installed in a vehicle. One exemplary interior trim panel is a headliner. Headliners are typically attached to an interior surface of a roof of a vehicle by adhesive and are therefore difficult to remove after installation. Some headliners cover up curtain-style airbags, sunroof regulators, and HVAC ducting. In addition to providing noise reduction and improved aesthetics, most headliners provide some degree of thermal insulation for the passenger compartment. While permanently installed headliners may not pose significant drawbacks in some vehicles, such headliners are not well suited to vehicles that have a removable roof or removable roof segments. Headliners can add significant weight to the removable roof or removable roof segments making the installation, removal, and handling of these components more difficult.

SUMMARY

This section provides a general summary of the disclosure, and is not a comprehensive disclosure of its full scope or all of its features.

In accordance with one aspect of the subject disclosure, a detachable interior trim panel assembly for a vehicle is provided. The vehicle has a trim panel mounting location and the detachable interior trim panel assembly includes an interior trim panel. The interior trim panel has an inside surface, an outside surface, and a trim panel perimeter. The inside surface of the interior trim panel faces a passenger compartment of the vehicle when the interior trim panel is installed. The outside surface of the interior trim panel is opposite the inside surface. The interior trim panel includes at least one finger and at least one spring snap that are positioned along the trim panel perimeter. The at least one finger and the at least one spring snap are configured to detachably retain the interior trim panel on the trim panel mounting location of the vehicle. The at least one finger extends outwardly from the trim panel perimeter and is sized to be received in at least one finger receptacle positioned along the trim panel mounting location of the vehicle. The at least one spring snap includes a moveable leg that is configured to engage at least one spring snap receptacle positioned along the trim panel mounting location of the vehicle. The at least one finger and at least one spring snap allow for the interior trim panel to be quickly installed on and removed from the trim panel mounting location of the vehicle with minimal effort. In some configurations, installation and/or removal of the interior trim panel can be accomplished without the use of tools.

In accordance with another aspect of the subject disclosure, the detachable interior trim panel assembly includes a vehicle body member. The vehicle body member has an exterior surface and an interior surface. The interior surface of the vehicle body member faces the passenger compartment of the vehicle and the trim panel mounting location is disposed on the interior surface of the vehicle body. Accordingly, the outside surface of the interior trim panel faces the interior surface of the vehicle body member when the interior trim panel is installed. The at least one finger receptacle and the at least one spring snap receptacle are positioned along the trim panel mounting location of the vehicle body member. The interior trim panel is detachably retained on the vehicle body member at the trim panel mounting location by the at least one finger and the at least one spring snap. When the interior trim panel is installed, the at least one finger extends outwardly from the trim panel perimeter such that the at least one finger is received in the at least one finger receptacle. During installation, the moveable leg of the at least one spring snap engages the at least one spring snap receptacle to secure the interior trim panel to the vehicle body member. In accordance with this arrangement, the interior trim panel can be quickly installed on and removed from the vehicle body member with minimal effort. Again, in some configurations, installation and/or removal of the interior trim panel can be accomplished without the use of tools.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a top perspective section view of the exemplary interior trim panel assembly taken along line 2-2 in FIG. 1;

FIG. 3 is a bottom elevation view of the exemplary interior trim panel illustrated in FIG. 1;

FIG. 4A is a top partial perspective view of the exemplary interior trim panel illustrated in FIG. 1 showing two exemplary spring snaps;

FIG. 4B is a side cross-sectional view of the exemplary interior trim panel assembly taken along line 4B-4B in FIG. 4A;

FIG. 5 is a bottom elevation view of the exemplary vehicle body member illustrated in FIG. 1 showing an exemplary trim panel mounting location;

FIG. 11 is a bottom elevation view of another exemplary interior trim panel assembly that includes exemplary left and right forward panels, an exemplary middle panel, and an exemplary rear panel mounted to another exemplary removable vehicle roof.

DETAILED DESCRIPTION

Referring to the Figures, wherein like numerals indicate corresponding parts throughout the several views, a detachable interior trim panel assembly 20 for a vehicle is disclosed. It should be appreciated that the disclosed detachable interior trim panel assembly 20 may be used in a wide range of different vehicle applications including, but not limited to, automobiles.

Figure 1:
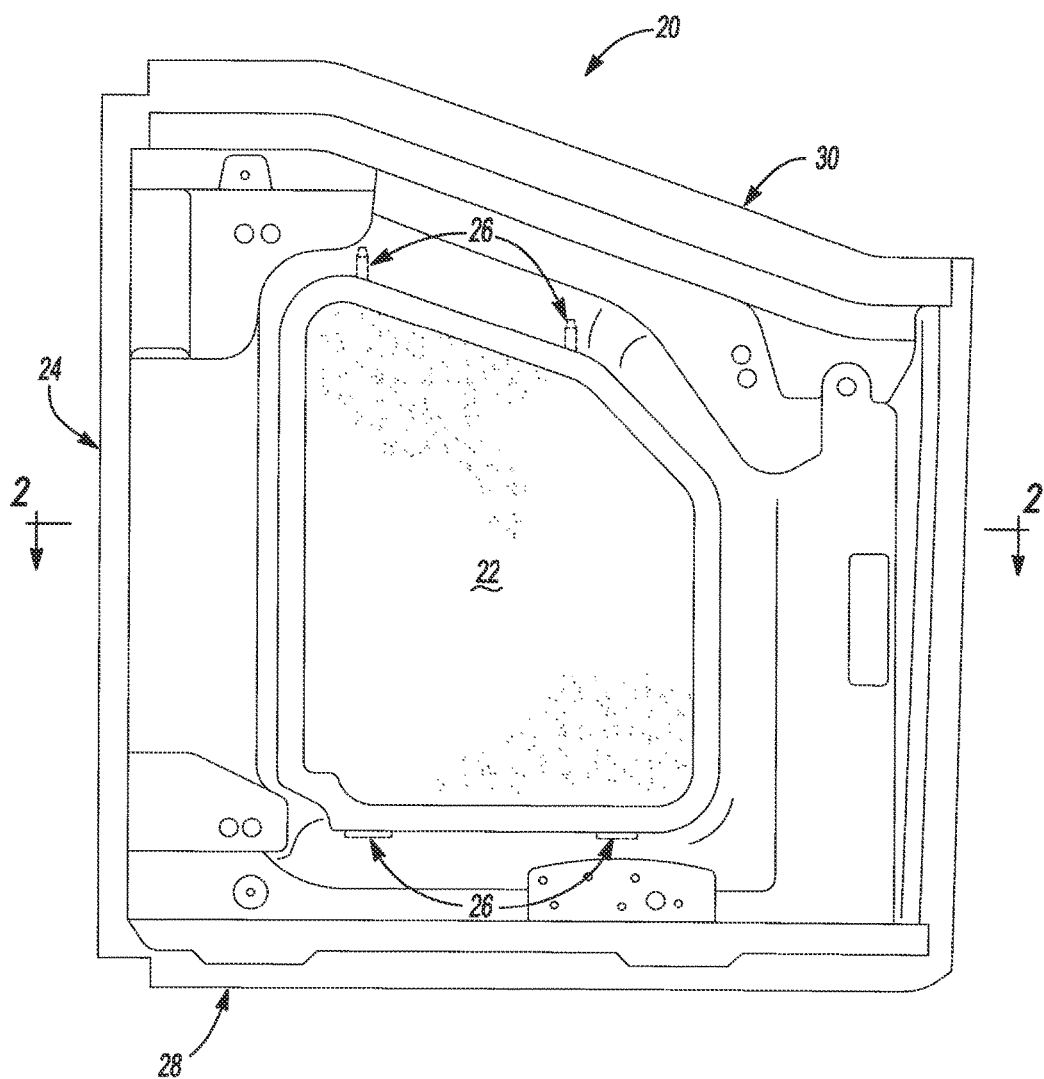
FIG. 1 is a bottom elevation view of an exemplary interior trim panel assembly that is constructed in accordance with the subject disclosure and shows the exemplary interior trim panel installed on an exemplary vehicle body member.

With reference to FIGS. 1-3, the detachable interior trim panel assembly 20 includes an interior trim panel 22 that is configured to be easily installed on and removed from a vehicle body member 24. FIG. 1 illustrates the interior trim panel 22 in an installed condition where the interior trim panel 22 is retained on the vehicle body member 24 at one or more attachment points 26. The vehicle body member 24 is part of the vehicle and may be comprised on one or more vehicle body components. The vehicle body member 24 generally extends between a forward end 28 and an aft end 30. The forward end 28 is located towards a front end of the vehicle and the aft end 30 is located towards a rear end of the vehicle. In the illustrated example, the interior trim panel 22 is a headliner of the vehicle and the vehicle body member 24 is a roof of the vehicle. More specifically, the interior trim panel 22 in the illustrated embodiment is part of a multi-piece headliner and the vehicle body member 24 is a removable hardtop roof. Notwithstanding the illustrated embodiment, it should be appreciated that the interior trim panel 22 may be located elsewhere in the vehicle and the vehicle body member 24 may be another segment of the vehicle besides the roof.

As best seen in FIG. 2, the vehicle body member 24 has an exterior surface 32 and an interior surface 34. The exterior and interior surfaces 32, 34 are arranged opposite one another on the vehicle body member 24. The interior surface 34 of the vehicle body member 24 generally faces toward a passenger compartment 36 of the vehicle and the exterior surface 32 of the vehicle body member 24 faces away from the passenger compartment 36 of the vehicle and toward the outside environment 38. Notwithstanding, it should be appreciated that the interior surface 34 of the vehicle body member 24 may or may not be left exposed to the passenger compartment 36 of the vehicle and the exterior surface 32 of the vehicle body member 24 may or may not be exposed to the outside environment 38. In some configurations, including the in the illustrated example, the vehicle body member 24 has an exterior wall 40 that defines the exterior surface 32 of the vehicle body member 24 and an interior wall 42 that defines at least part of the interior surface 34 of the vehicle body member 24. In other configurations (not shown), the vehicle body member 24 may be molded as a single piece such that the vehicle body member 24 has only one wall. The interior surface 34 of the vehicle body member 24 has a trim panel mounting location 44 where the interior trim panel 22 attaches to the vehicle and more specifically to the vehicle body member 24. Although other configurations are possible, in the illustrated example, the trim panel mounting location 44 is defined by one or more contours 46 disposed along the interior surface 34 of the vehicle body panel such that the trim panel mounting location 44 has the form of a recessed area in the vehicle body member 24. The trim panel mounting location 44 has a periphery 48 that is at least partially bounded by the contours 46 of the interior surface 34 of the vehicle body member 24. The exterior wall 40 and the interior wall 42 of the vehicle body member 24 are spaced apart from one another at the contours 46 and form one or more internal cavities 50 in the vehicle body member 24.

As shown in FIG. 2, the interior wall 42 of the vehicle body member 24 extends between an inner edge 52 and outer edge 54. The inner edge 52 of the interior wall 42 extends into the trim panel mounting location 44. The inner edge 52 of the interior wall 42 exposes the exterior wall 40 along the trim panel mounting location 44 such that part of the exterior wall 40 defines part of the interior surface 34 of the vehicle body member 24 in the trim panel mounting location 44. It can also be seen in FIG. 2 that the interior trim panel 22 has an inside surface 56 and an outside surface 58. When the interior trim panel 22 is installed on the trim panel mounting location 44 of the vehicle body member 24, the inside surface 56 of the interior trim panel 22 faces toward the passenger compartment 36 of the vehicle and the outside surface 58 of the interior trim panel 22 faces toward the interior surface 34 of the vehicle body member 24. In some configurations, the outside surface 58 of the interior trim panel 22 may directly abut (i.e. contact) the interior surface 34 of the vehicle body member 24 when the interior trim panel 22 is installed. In other configurations, including in the illustrated example, the outside surface 58 of the interior trim panel 22 is spaced from the interior surface 34 of the vehicle body member 24 by an air space 60.

As best seen in FIG. 3, the interior trim panel 22 has a trim panel perimeter 62, a front 64, a back 66, and a pair of sides 68. The front 64 of the interior trim panel 22 faces the forward end 28 of the vehicle body member 24 and the back 66 of the interior trim panel 22 faces the aft end 30 of the vehicle body member 24 when the interior trim panel 22 is installed (as shown in FIGS. 1 and 2). The pair of sides 68 of the interior trim panel 22 extend between the front 64 and the back 66 of the interior trim panel 22. Although the interior trim panel 22 may be constructed in numerous ways, in the illustrated example, the interior trim panel 22 includes a trim panel insert 70 and a trim panel frame 72. Notwithstanding, it should be appreciated that the interior trim panel 22 could alternatively be frameless in design. The trim panel insert 70 defines at least part of the inside surface 56 and the outside surface 58 of the interior trim panel 22 and the trim panel frame 72 supports the trim panel insert 70. The trim panel insert 70 is made of a first material having a first rigidity. The trim panel frame 72 is made of a second material having a second rigidity that is greater than the first rigidity. As such, the trim panel insert 70 may be made of a material that is soft to the touch and aesthetically pleasing while the trim panel frame 72 can be made from a more rigid material that provides structural support to the interior trim panel 22 so that the interior trim panel 22 remains in place on the vehicle body member 24 and does not droop, sag, or bow. When the interior trim panel 22 is in the installed condition as shown in FIGS. 1 and 2, the interior trim panel 22 is received in the trim panel mounting location 44 where the trim panel frame 72 is received in the periphery 48 of the trim panel mounting location 44.

With reference to FIGS. 2-5, the trim panel frame 72 includes a peripheral wall 74, a flange 76, and one or more tabs 78. The peripheral wall 74 defines at least part of the trim panel perimeter 62. As shown in FIG. 3, the flange 76 of the trim panel frame 72 extends inwardly from the peripheral wall 74 and along part of the inside surface 56 of the interior trim panel 22. As shown in FIG. 4A, the tabs 78 of the trim panel frame 72 extend inwardly from the peripheral wall 74 and along part of the outside surface 58 of the interior trim panel 22. In the example illustrated in FIG. 4A, the trim panel frame 72 has multiple tabs 78 that are separated from one another by a plurality of breaks 80. Notwithstanding, it should be appreciated that a single tab (not shown) that extends about the entire trim panel perimeter 62 is a suitable alternative. As shown in FIG. 2, the flange 76 and the tabs 78 of trim panel frame 72 are spaced apart from one another in an opposing and generally parallel relationship. At least part of the trim panel insert 70 is disposed between the flange 76 and the tabs 78 such that the flange 76 and the tabs 78 secure the trim panel insert 70 to the trim panel frame 72.

FIG. 5 illustrates the vehicle body member 24 where the interior trim panel 22 has been removed. In this view, it can be seen that the vehicle body member 24 includes one or more finger receptacles 82 and one or more spring snap receptacles 84. Although the vehicle body member 24 includes two finger receptacles 82 and two spring snap receptacles 84 in the illustrated examples, any number of finger receptacles 82 and spring snap receptacles 84 may be used and may be located at various locations along the interior surface 34 of the vehicle body member 24. In the embodiment shown in the drawings, the finger receptacles 82 and the spring snap receptacles 84 are positioned across from one another along the periphery 48 of the trim panel mounting location 44. More specifically, the finger receptacles 82 are positioned between the inner edge 52 of the interior wall 42 and the aft end 30 of the vehicle body member 24 and the spring snap receptacles 84 are positioned between the inner edge 52 of the interior wall 42 and the forward end 28 of the vehicle body member 24. Although other configurations are possible, the finger receptacles 82 and the spring snap receptacles 84 may extend from the interior wall 42 into the internal cavities 50 in the vehicle body member 24 so as to form an opening, pocket, or recess in the interior wall 42 of the vehicle body member 24. Optionally, one or more finger receptacle bushings 86 may be installed in the finger receptacles 82 and one or more spring snap receptacle bushings 88 may be installed in the spring snap receptacles 84. The finger receptacle bushings 86 and the spring clip receptacle bushings 88 may be made of a resilient material such as rubber to help seal the finger receptacles 82 and the spring clip receptacles 84 against leaks.

Referring again to FIG. 3 and FIGS. 4A and 4B, the interior trim panel 22 includes one or more fingers 90 and one or more spring snaps 92. The interior trim panel 22 is removably retained on the vehicle body member 24 at the trim panel mounting location 44 by the fingers 90 and the spring snaps 92. Although the interior trim panel 22 includes two fingers 90 and two spring snaps 92 in the illustrated examples, any number of fingers 90 and spring snaps 92 may be used and may be located at various locations along the interior trim panel 22. In the embodiment shown in the drawings, the fingers 90 and the spring snaps 92 are positioned across from one another along the trim panel perimeter 62. More specifically, the spring snaps 92 are positioned at the front 64 of the interior trim panel 22 and the fingers 90 are positioned at the back 66 of the interior trim panel 22.

As best seen in FIG. 3, the fingers 90 extend outwardly from the peripheral wall 74 of the trim panel frame 72 and away from the trim panel insert 70. The fingers 90 of the interior trim panel 22 are aligned with and are received in the finger receptacles 82 of the vehicle body member 24 when the interior trim panel 22 is positioned in the trim panel mounting location 44 (as shown in FIGS. 1 and 2). Although a wide variety of different constructions and shapes are possible, in the illustrated example, each of the fingers 90 has a cylindrically shaped base 94 that extends from the peripheral wall 74 of the trim panel frame 72 to a frusto-conically shaped tip 96. When the fingers 90 of the interior trim panel 22 are inserted into the finger receptacles 82 of the vehicle body member 24, the finger receptacle bushings 86 are disposed between the fingers 90 and the interior wall 42 of the vehicle body member 24.

As best seen in FIGS. 4A and 4B, the spring snaps 92 extend from the flange 76 of the trim panel frame 72 in a direction that is substantially transverse to the flange 76 and substantially parallel to the peripheral wall 74. The spring snaps 92 are aligned with and lockingly engage the spring snap receptacles 84 when the interior trim panel 22 is positioned in the trim panel mounting location 44 (as shown in FIGS. 1 and 2). Each of the spring snaps 92 includes a moveable leg 98 that is connected to the trim panel frame 72 by a first living hinge 100. The first living hinge 100 gives the moveable leg 98 a spring-like action and allows the moveable leg 98 to deflect towards and away from the trim panel insert 70 in a pivoting movement about the first living hinge 100. The moveable leg 98 terminates at a ramped end 102 and is separated from at least part of the peripheral wall 74 of the trim panel frame 72 by a pair of slots 104. The ramped end 102 of each of the spring snaps 92 increases in thickness moving towards the first living hinge 100 to form a lip 106. The lip 106 of the ramped end 102 extends outwardly from the moveable leg 98 and is received in the spring snap receptacles 84 when the interior trim panel 22 is positioned in the trim panel mounting location 44 (as shown in FIGS. 1 and 2).

It should be appreciated that the fingers 90 and the spring snaps 92 of the interior trim panel 22 and the finger receptacles 82 and the spring snap receptacles 84 of the vehicle body member 24 are positioned at the attachment points 26 illustrated in FIG. 1. The arrangement of the fingers 90 and spring snaps 92 of the interior trim panel 22 and the finger receptacles 82 and the spring snap receptacles 84 of the vehicle body member 24 provide quick and easy installation and removal of the interior trim panel 22. During installation, the interior trim panel 22 is first positioned in alignment with the trim panel mounting location 44 of the vehicle body member 24 with the outside surface 58 of the interior trim panel 22 facing the interior surface 34 of the vehicle body member 24. Second, the interior trim panel 22 is moved aft relative to the vehicle body member 24 such that the fingers 90 on the back 66 of the interior trim panel 22 are received in the finger receptacles 82 in the vehicle body member 24. Third, the interior trim panel 22 is pivoted, where the front 64 of the interior trim panel 22 swings toward the interior surface 34 of the vehicle body member 24, such that the spring snaps 92 of the interior trim panel 22 lockingly engage the spring snap receptacles 84 of the vehicle body member 24. More specifically, as the front 64 of the interior trim panel 22 swings toward the interior surface 34 of the vehicle body member 24, the ramped ends 102 of the spring snaps 92 contact the contours 46 on the interior surface 34 of the vehicle body member 24. The shape of the ramped ends 102 causes the moveable legs 98 to deflect towards the trim panel insert 70. As the ramped ends 102 slide along the contours 46, the lips 106 of the ramped ends 102 eventually pass into the spring snap receptacles 84 in the vehicle body member 24. At this point, the moveable legs 98 snap back 66, deflecting away from the trim panel insert 70, such that the lips 106 of the ramped ends 102 extend further into the spring snap receptacles 84 to lock the interior trim panel 22 in place. Accordingly, the interior trim panel 22 is securely retained on the vehicle body member 24 at the trim panel mounting location 44. During removal, the moveable legs 98 of the spring snaps 92 are first pressed towards the trim panel insert 70. This causes the lips 106 of the ramped ends 102 to retract from the spring snap receptacles 84, releasing the spring snaps 92 from the vehicle body member 24. The front 64 of the interior trim panel 22 can then be pivoted away from the interior surface 34 of the vehicle body member 24 and the interior trim panel 22 can be moved forward relative to vehicle body member 24 to pull the fingers 90 of the interior trim panel 22 out from the finger receptacles 82 in the vehicle body member 24. Obviously, the fingers 90, spring snaps 92, finger receptacles 82, and spring snap receptacles 84 may be provided at alternative locations to those shown in the illustrated example, which may change the direction of manipulation required to install and remove the interior trim panel 22.

Figure 6:
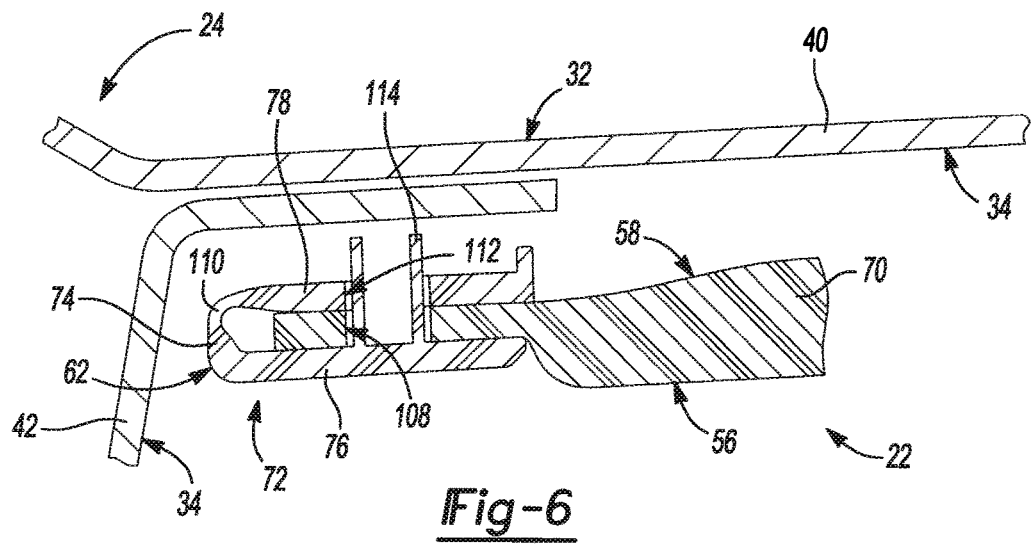
FIG. 6 is a partial side cross-sectional view of the exemplary interior trim panel assembly taken along line 2-2 in FIG. 1 showing an exemplary heat stake of the interior trim panel.

The trim panel insert 70 may be secured to the trim panel frame 72 in a variety of different ways. One exemplary arrangement is illustrated in FIG. 6, where the trim panel insert 70 has a plurality of holes 108 that are positioned adjacent the trim panel perimeter 62. The trim panel frame 72 includes a second living hinge 110 disposed between the peripheral wall 74 and the tabs 78. The second living hinge 110 permits an orientation of the tabs 78 where the peripheral wall 74, the flange 76, and the one or more tabs 78 form a C-shaped channel that receives at least part of the trim panel insert 70. The tabs 78 include a plurality of heat stake holes 112 that are aligned with the plurality of holes 108 in the trim panel insert 70. The flange 76 includes a plurality of heat stakes 114 that extend through the plurality of holes 108 in the trim panel insert 70 and the plurality of heat stake holes 112 in the tabs 78. Accordingly, the plurality of heat stakes 114 lock the tabs 78 in place and prevent the trim panel insert 70 from moving relative to the trim panel frame 72.

Figure 7:
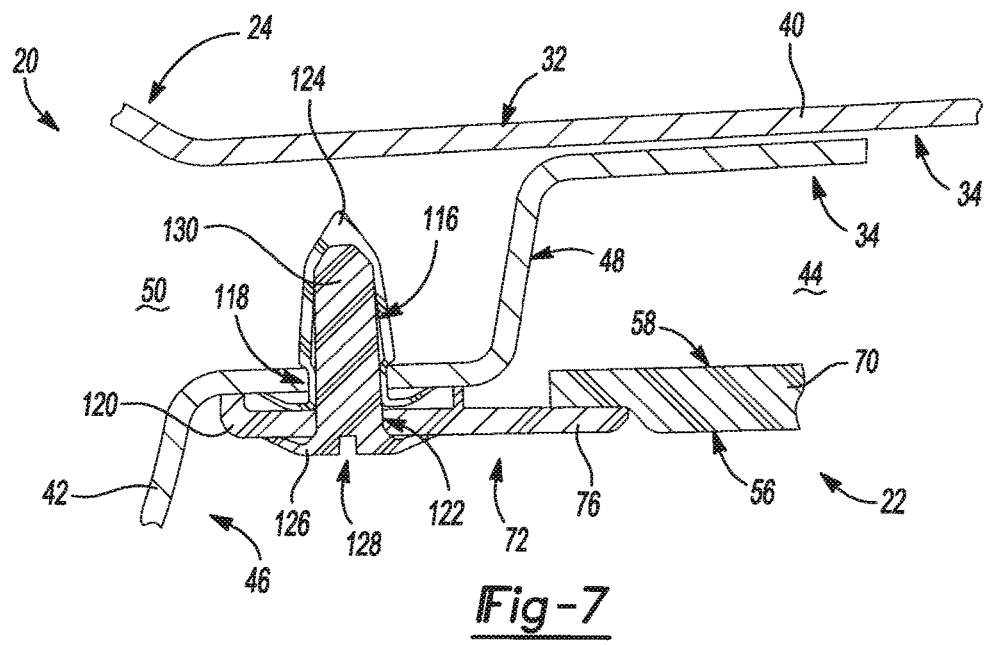
FIG. 7 is a partial side cross-sectional view of the exemplary interior trim panel assembly taken along line 2-2 in FIG. 1 showing an exemplary fastener arrangement for securing the interior trim panel to an interior wall of the vehicle body member.
Figure 8:
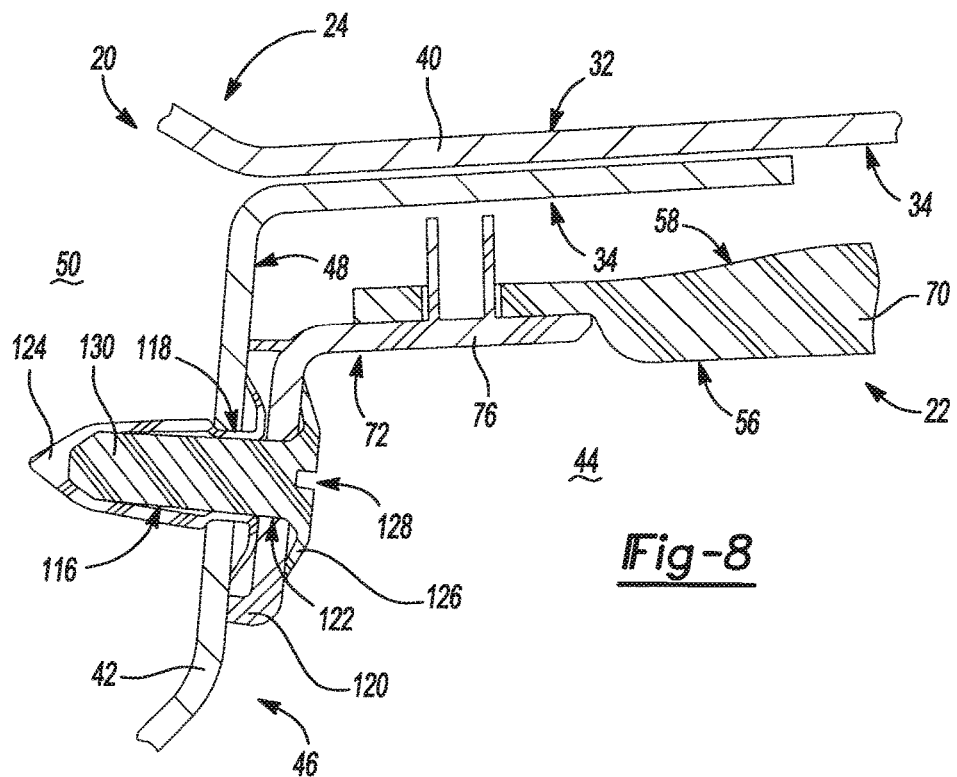
FIG. 8 is a partial side cross-sectional view of the exemplary interior trim panel assembly taken along line 2-2 in FIG. 1 showing another exemplary fastener arrangement for securing the interior trim panel to the interior wall of the vehicle body member.

With reference to FIGS. 7 and 8, the detachable interior trim panel assembly 20 may optionally include a plurality of trim panel fasteners 116, which in addition to the fingers 90 and the spring snaps 92, help secure the interior trim panel 22 in place on the vehicle body member 24. As shown in FIGS. 7 and 8, the vehicle body member 24 may have a plurality of fastener receptacles 118 that extend from the interior wall 42 into the one or more internal cavities 50. The plurality of fastener receptacles 118 are located along the periphery 48 of the trim panel mounting location 44 and may be set at different orientations depending upon the contours 46 of the interior wall 42 at that particular location. The trim panel frame 72 includes one or more fastener retaining segments 120 that have a plurality of fastener holes 122. The plurality of fasteners 116 extend through the plurality of fastener holes 122 in the fastener retaining segments 120 of the trim panel frame 72 and into the plurality of fastener receptacles 118 in the vehicle body member 24 to secure the interior trim panel 22 to the vehicle body member 24. Optionally, a plurality of fastener receptacle bushings 124 may be disposed within the plurality of fastener receptacles 118. The plurality of finger receptacle bushings 86 may be made of a resilient material, such as rubber, and help seal the plurality of fastener receptacles 118 against leaks. In some configurations, the plurality of fastener receptacle bushings 124 may be internally threaded. Each of the plurality of fasteners 116 may have a head portion 126 that includes a tool interface 128 and a threaded portion 130 that threadingly engages the fastener receptacle bushing 124. The threaded portion 130 of each of the plurality of fasteners 116 may be configured such that a ninety degree turn of the head portion 126 engages or disengages the threaded portion 130. Although the tool interface 128 may take a variety of different forms, in one example, the tool interface 128 is configured to receive a screwdriver.

Figure 9:
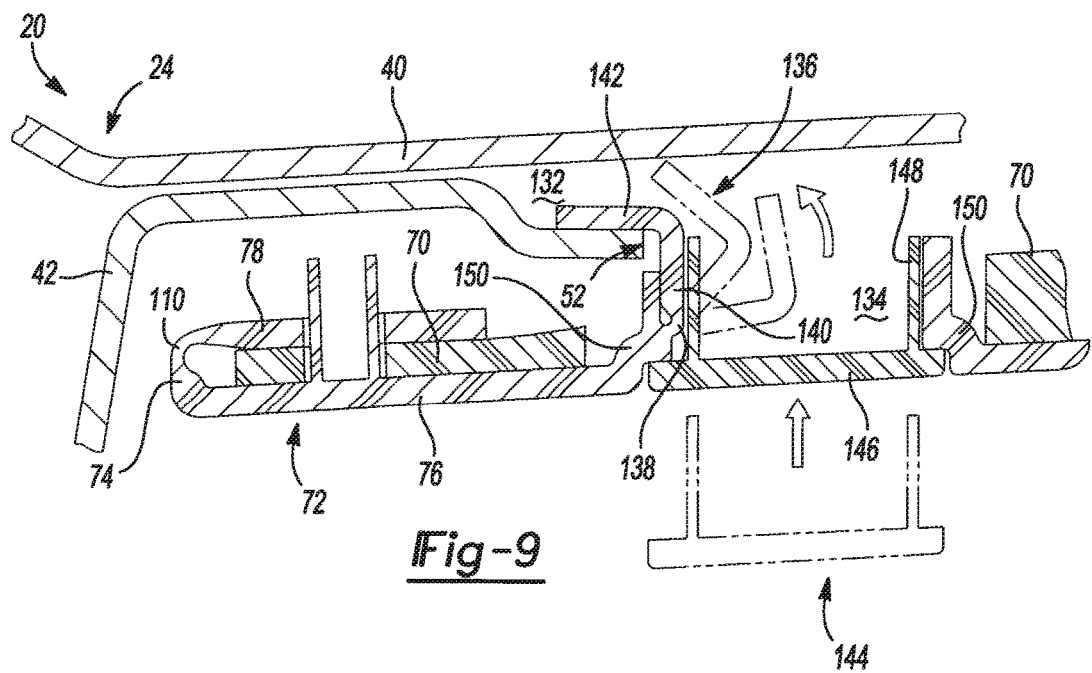
FIG. 9 is a partial side cross-sectional view of the exemplary interior trim panel assembly taken along line 2-2 in FIG. 1 showing another exemplary arrangement for securing the interior trim panel to the interior wall of the vehicle body member.

FIG. 9 illustrates an alternative to the plurality of fasteners 116 illustrated in FIGS. 7 and 8. As shown in FIG. 9, the inner edge 52 of the interior wall 42 is spaced from the exterior wall 40 by a gap 132. The trim panel frame 72 includes one or more openings 134 that are located inward of the peripheral wall 74. The trim panel frame 72 has one or more moveable arms 136 that extend from the flange 76 at a location that is positioned inward of the peripheral wall 74 and adjacent to the openings 134 in the trim panel frame 72. FIG. 9 shows one of the moveable arms 136, which is connected to the flange 76 of the trim panel frame 72 by a third living hinge 138. The moveable arm 136 includes a first segment 140 that extends from the third living hinge 138 and a second segment 142 that extends from the first segment 140 at a transverse orientation with respect to the first segment 140. Accordingly, the moveable arm 136 shown in FIG. 9 has an L-shaped cross-section. In accordance with this configuration, the detachable interior trim panel assembly 20 includes one or more plugs 144. Each one of the plugs 144 has a top portion 146 and an insertion portion 148 that extends transversely from the top portion 146. The insertion portion 148 of each one of the plugs 144 is sized for insertion into the openings 134 in the trim panel frame 72. The insertion portion 148 of the plug 144 shown in FIG. 9 contacts the first segment 140 of the moveable arm 136 when the plug 144 is inserted into the opening 134 in the trim panel frame 72. The insertion portion 148 of the plug 144 moves the moveable arm 136 in a pivoting or swinging motion from an unlocked position to a locked position. In the unlocked position, the second segment 142 of the moveable arm 136 is positioned in the opening 134 in the trim panel frame 72. In the locked position, the second segment 142 of the moveable arm 136 extends into the gap 132 between the inner edge 52 of the interior wall 42 and the exterior wall 40 to secure the interior trim panel 22 to the vehicle body member 24. It should be appreciated that the insertion portion 148 of the plug 144 may take a variety of different shapes. By way of non-limiting example, the insertion portion 148 of the plug 144 may be tubular in shape. Optionally, the trim panel frame 72 may have stepped walls 150 that define the openings 134 in the trim panel frame 72. The top portion 146 of the plug 144 extends beyond and overhangs the insertion portion 148 of the plug 144 such that the top portion 146 of the plug 144 contacts the stepped walls 150 preventing further advancement of the insertion portion 148 into the opening 134 in the trim panel frame 72.

Figure 10:
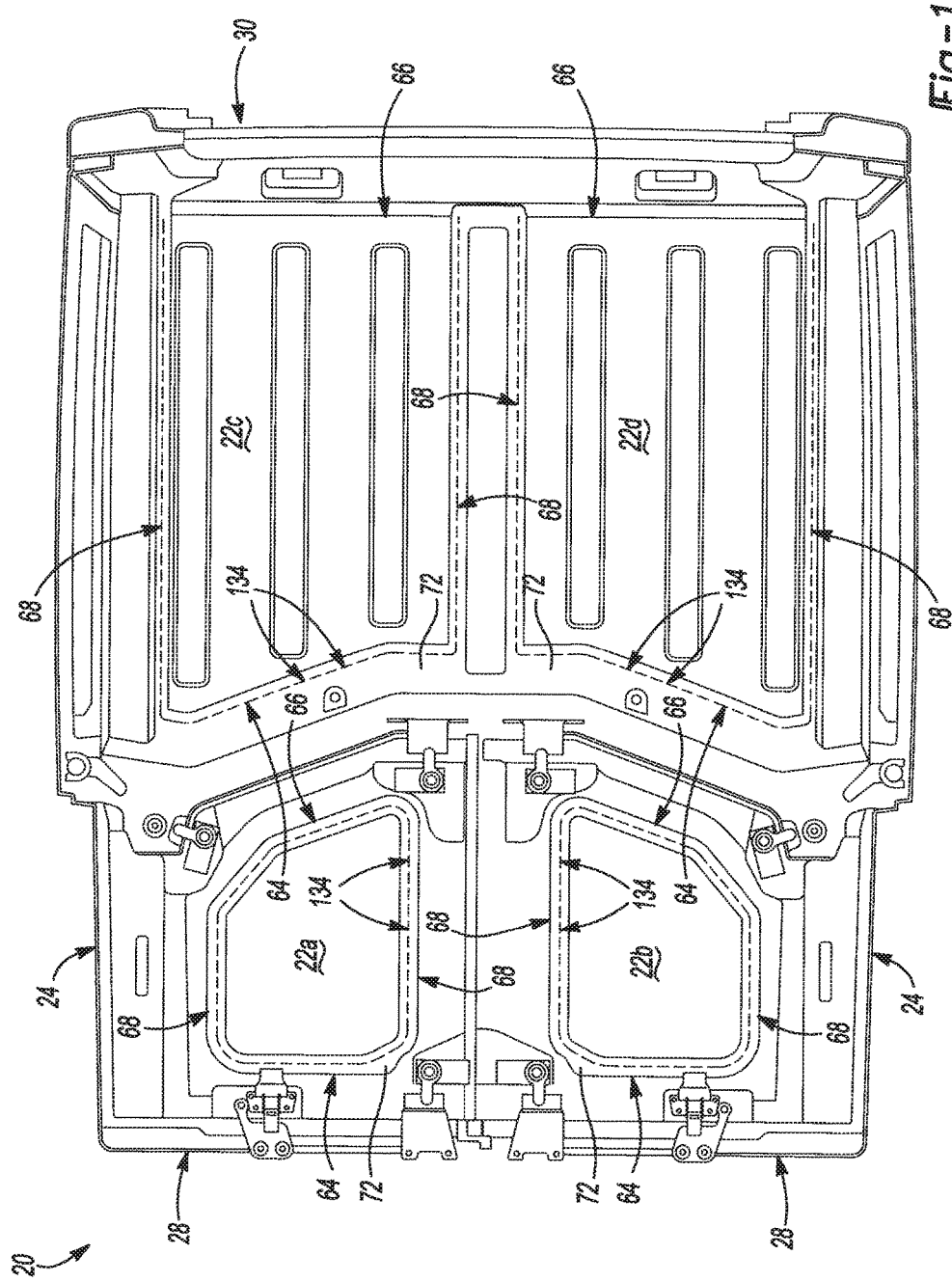
FIG. 10 is a bottom elevation view of another exemplary interior trim panel assembly that includes exemplary left and right forward panels and exemplary left and right rear panels mounted to an exemplary removable vehicle roof.

As shown in FIGS. 10 and 11, the detachable interior trim panel assembly 20 may include multiple interior trim panels 22*a-f* that are detachably engaged to the vehicle body member 24. In FIGS. 10 and 11, the vehicle body member 24 illustrated is a roof of the vehicle and the multiple interior trim panels 22*a-f* form a headliner of the vehicle. More specifically, the rooves shown in FIGS. 10 and 11 are detachable from the vehicle. As such, these rooves are commonly referred to in the automotive industry as removable hard tops. It should be appreciated that the vehicle body member 24 in FIG. 10 is shorter in length than the vehicle body member 24' illustrated in FIG. 11. That is, the distance between the forward end 28 and the aft end 30 of the vehicle body member 24 in FIG. 10 is smaller than the distance between the forward end 28 and the aft end 30 of the vehicle body member 24' illustrated in FIG. 11. Accordingly, the vehicle body member 24 illustrated in FIG. 10 is well suited for use with two-door vehicles while the vehicle body member 24' illustrated in FIG. 11 is well suited for use with four-door vehicles.

The multiple interior trim panels 22*a-d* of the detachable interior trim panel assembly 20 shown in FIG. 10 include a left forward panel 22*a*, a right forward panel 22*b*, a left rear panel 22*c*, and a right rear panel 22*d*. In accordance with one configuration where the detachable interior trim panel assembly 20 shown in FIG. 10 includes the attachment arrangement illustrated in FIG. 9, the multiple openings 134 in the trim panel frame 72 and the multiple plugs 144 are disposed along the front 64, back 66, and sides 68 of the left and right forward panels 22*a-b* and along only the front 64 and sides 68 of the left and right rear panels 22*c-d*. The multiple interior trim panels 22*a-b* and 22*e-f* of the detachable interior trim panel assembly 20 shown in FIG. 11 include the left and right forward panels 22*a-b*, a middle panel 22*e*, and a rear panel 22*f*. In accordance with one configuration where the detachable interior trim panel assembly 20 shown in FIG. 11 includes the attachment arrangement illustrated in FIG. 9, the multiple openings 134 in the trim panel frame 72 and the multiple plugs 144 are disposed along the front 64, back 66, and sides 68 of the left and right forward panels 22*a-b*, along the front 64, back 66, and sides 68 of the middle panel 22*e*, and along only the front 64 and sides 68 of rear panel 22*f*.

The ease with which the multiple interior trim panels 22*a-f* can be installed on and removed from the vehicle body members 24, 24' shown in FIGS. 10 and 11 is particularly advantageous by providing a way for the weight of the vehicle body member 24, 24' to be reduced before the vehicle body member 24, 24' is to be detached from the vehicle. If a traditional headliner were fitted to the vehicle body members 24, 24' shown in FIGS. 10 and 11 instead of the detachable interior trim panel assembly 20, the vehicle body members 24, 24' would be too heavy for people to easily remove, transport, and re-install by hand. Accordingly, the detachable interior trim panel assembly 20 disclosed herein provides a way to equip the vehicle body members 24, 24' shown in FIGS. 10 and 11 with headliners while still allowing one or more persons to lift and position of the vehicle body members 24, 24' on a vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. A detachable interior trim panel assembly for a vehicle having a trim panel mounting location, said detachable interior trim panel assembly comprising:
    an interior trim panel having an inside surface facing a passenger compartment of the vehicle, an outside surface that is opposite said inside surface, and a trim panel perimeter, said trim panel perimeter including a peripheral wall extending between said outside surface and said inside surface of said interior trim panel;
    said interior trim panel including at least one finger and at least one spring snap that are positioned along said trim panel perimeter; and
    said at least one finger and said at least one spring snap being configured to detachably retain said interior trim panel on the trim panel mounting location of the vehicle wherein said at least one finger extends outwardly from said peripheral wall of said trim panel perimeter in a direction that is transverse to said peripheral wall, said at least one finger is sized to be received in at least one finger receptacle positioned along the trim panel mounting location of the vehicle, and said at least one spring snap includes a moveable leg that is configured to engage at least one spring snap receptacle positioned along the trim panel mounting location of the vehicle.

2. The detachable interior trim panel assembly of claim 1, wherein said at least one finger and said at least one spring snap are positioned across from one another on said interior trim panel.

3. The detachable interior trim panel assembly of claim 2, wherein said interior trim panel includes a front facing towards a front end of the vehicle, a back facing towards a rear end of the vehicle, and a pair of sides extending between said front and back of said interior trim panel and wherein said at least one spring snap is positioned at said front of said interior trim panel and said at least one finger is positioned at said back of said interior trim panel.

4. The detachable interior trim panel assembly of claim 2, wherein said at least one finger includes two fingers that are spaced apart from one another on said interior trim panel and said at least one spring snap includes two spring snaps that are spaced apart from one another on said interior trim panel.

5. The detachable interior trim panel assembly of claim 1, wherein said moveable leg of said at least one spring snap is connected to said trim panel perimeter by a living hinge and terminates at a ramped end.

6. The detachable interior trim panel assembly of claim 5, wherein said ramped end of said at least one spring snap increases in thickness moving towards said living hinge to form a lip that extends outwardly from said moveable leg and into said at least one spring snap receptacle when said interior trim panel is installed to lock said interior trim panel in place.

7. The detachable interior trim panel assembly of claim 1, wherein said at least one finger has a cylindrically shaped base and a frusto-conically shaped tip.

8. The detachable interior trim panel assembly of claim 1, wherein said interior trim panel forms at least part of a headliner of the vehicle.

9. A detachable interior trim panel assembly for a vehicle comprising:
   a vehicle body member including an exterior surface and an interior surface facing a passenger compartment of the vehicle, said interior surface of said vehicle body member having a trim panel mounting location;
   an interior trim panel having an inside surface that faces the passenger compartment of the vehicle when said interior trim panel is installed, an outside surface that faces said interior surface of said vehicle body member when said interior trim panel is installed, and a trim panel perimeter, said trim panel perimeter including a peripheral wall extending between said outside surface and said inside surface of said interior trim panel;
   said vehicle body member having at least one finger receptacle and at least one spring snap receptacle that are positioned along said trim panel mounting location; and
   said interior trim panel including at least one finger and at least one spring snap, said interior trim panel being detachably retained on said vehicle body member at said trim panel mounting location by said at least one finger and said at least one spring snap wherein said at least one finger extends outwardly from said peripheral wall of said trim panel perimeter in a direction that is transverse to said peripheral wall such that said at least one finger is received in said at least one finger receptacle when said interior trim panel is installed and said at least one spring snap includes a moveable leg disposed on said trim panel perimeter that engages said at least one spring snap receptacle when said interior trim panel is installed.

10. The detachable interior trim panel assembly of claim 9, wherein said vehicle body member includes an exterior wall that defines said exterior surface of said vehicle body member and an interior wall that defines at least part of the interior surface of said vehicle body member, said interior wall of said vehicle body member extending between an inner edge and an outer edge, said inner edge of said interior wall exposing said exterior wall at said trim panel mounting location such that part of said exterior wall defines part of said interior surface of said vehicle body member at said trim panel mounting location, and said inner edge of said interior wall being spaced from said exterior wall by a gap.

11. The detachable interior trim panel assembly of claim 10, wherein said interior trim panel includes at least one opening adjacent said trim panel perimeter and at least one moveable arm that extends from said interior trim panel at a location adjacent to said at least one opening, said at least one moveable arm being connected to said interior trim panel by a living hinge, and said at least one moveable arm including a first segment that extends from said living hinge and a second segment that extends from said first segment at a transverse orientation with respect to said first segment.

12. The detachable interior trim panel assembly of claim 10, further comprising:
   at least one plug having a top portion and an insertion portion that extends transversely from said top portion, said insertion portion of said plug being sized for insertion into said at least one opening in said interior trim panel such that said insertion portion of said plug contacts said first segment of said at least one moveable arm during insertion and moves said at least one moveable arm from an unlocked position to a locked position, said second segment of said at least one moveable arm being disposed in said at least one opening in said interior trim panel when said at least one moveable arm is in said unlocked position and said second segment of said at least one moveable arm extending into said gap between said inner edge of said interior wall and said exterior wall when said at least one moveable arm is in said locked position to secure said interior trim panel to said vehicle body member.

13. The detachable interior trim panel assembly of claim 9, further comprising:
   multiple interior trim panels detachably engaged with the vehicle body member, said vehicle body member being a roof of the vehicle and said multiple interior trim panels forming a headliner.

14. The detachable interior trim panel assembly of claim 13, wherein multiple interior trim panels include left and right forward panels and left and right rear panels.

15. The detachable interior trim panel assembly of claim 13, wherein multiple interior trim panels include left and right forward panels, a middle panel, and a rear panel.

16. The detachable interior trim panel assembly of claim 9, wherein said vehicle body member is a roof of the vehicle and said interior trim panel forms at least part of a headliner of the vehicle.

17. The detachable interior trim panel assembly of claim 9, wherein said at least one finger receptacle and said at least one spring snap receptacle are positioned across from one another relative to said trim panel mounting location and wherein said at least one finger and said at least one spring snap are positioned across from one another along said trim panel perimeter.

18. The detachable interior trim panel assembly of claim 9, further comprising:
   at least one finger receptacle bushing disposed within and sealing said at least one finger receptacle; and
   at least one spring snap receptacle bushing disposed within and sealing said at least one spring snap receptacle.

19. The detachable interior trim panel assembly of claim 9, wherein said interior trim panel includes a trim panel insert and a trim panel frame that supports said trim panel insert, said trim panel frame including said peripheral wall that defines said trim panel perimeter, a flange that extends inwardly from said peripheral wall along said inside surface of said interior trim panel, and at least one tab that extends inwardly from said peripheral wall along said outside surface of said interior trim panel such that said peripheral wall, said flange, and said at least one tab form a C-shaped channel that receives at least part of said trim panel insert.

20. The detachable interior trim panel assembly of claim 19, wherein said at least one finger and said at least one spring snap are attached to said trim panel frame and wherein said trim panel insert is made of a first material having a first rigidity and said trim panel frame is made of a second material having a second rigidity that is greater than said first rigidity.

* * * * *